United States Patent
Shah et al.

(10) Patent No.: US 10,352,183 B2
(45) Date of Patent: Jul. 16, 2019

(54) HIGH TEMPERATURE SEAL AND METHOD

(71) Applicant: United Technologies Corporation, Farmington, CT (US)

(72) Inventors: Dilip M. Shah, Glastonbury, CT (US); Katelyn Kwoka, Portsmouth, NH (US); Alan D. Cetel, West Hartford, CT (US); Venkatarama K. Seetharaman, Rocky Hill, CT (US); Michael G. McCaffrey, Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 644 days.

(21) Appl. No.: 15/137,503

(22) Filed: Apr. 25, 2016

(65) Prior Publication Data
US 2017/0306782 A1   Oct. 26, 2017

(51) Int. Cl.
*F01D 11/08* (2006.01)
*F01D 5/12* (2006.01)
(Continued)

(52) U.S. Cl.
CPC ............... *F01D 11/08* (2013.01); *F01D 5/12* (2013.01); *F01D 9/041* (2013.01); *F01D 11/005* (2013.01);
(Continued)

(58) Field of Classification Search
CPC . F01D 11/08; F01D 5/12; F01D 25/12; F01D 9/041; F01D 11/005; F01D 25/005;
(Continued)

(56) References Cited

U.S. PATENT DOCUMENTS 3,918,964 A * 11/1975 Baldwin ............... C22C 19/052
420/451
5,474,305 A * 12/1995 Flower ................. F16J 15/3288
277/355
(Continued)

FOREIGN PATENT DOCUMENTS

EP   1013887 A1   6/2000
EP   1394362 A2   3/2004
(Continued)

OTHER PUBLICATIONS

Ken Harris, Improved Single Crystal Superalloys, 2004, The Minerals, Metals and Materials Society, Superalloys 2004, pp. 45-52 (Year: 2004).*
(Continued)

*Primary Examiner* — Eldon T Brockman
(74) *Attorney, Agent, or Firm* — Kinney & Lange, P.A.

(57) ABSTRACT

An embodiment of a turbine assembly includes, among other possible things, a first component including a first component surface, a second component including a second component surface spaced apart from the first component surface, and a brush seal disposed between the first component and the second component. The brush seal includes, among other things, a first bristled region extending in a first direction from a backing plate, and sealingly engaging one of the first component surface and the second component surface. At least one of the backing plate and the first bristled region includes a nickel-based superalloy material having at least 40% of a $Ni_3(Al,X)$ precipitate phase, X being a metallic or refractory element other than Al.

15 Claims, 11 Drawing Sheets

(51) Int. Cl.
*F01D 9/04* (2006.01)
*F01D 11/00* (2006.01)
*F01D 25/00* (2006.01)
*F01D 25/12* (2006.01)
*F16J 15/3288* (2016.01)

(52) U.S. Cl.
CPC ............ *F01D 25/005* (2013.01); *F01D 25/12* (2013.01); *F16J 15/3288* (2013.01); *F05D 2220/32* (2013.01); *F05D 2230/00* (2013.01); *F05D 2240/56* (2013.01); *F05D 2300/175* (2013.01); *F05D 2300/177* (2013.01); *F05D 2300/506* (2013.01)

(58) Field of Classification Search
CPC .............. F16J 15/3288; F05D 2240/56; F05D 2300/175; F05D 2220/32; F05D 2300/177; F05D 2230/00; F05D 2300/506
See application file for complete search history.

(56) References Cited

U.S. PATENT DOCUMENTS

| | | | | |
|---|---|---|---|---|
| 5,480,165 | A * | 1/1996 | Flower | F16J 15/3288 277/355 |
| 5,609,469 | A | 3/1997 | Worley et al. | |
| 6,170,831 | B1 * | 1/2001 | Bouchard | F01D 11/005 277/355 |
| 6,547,257 | B2 * | 4/2003 | Cromer | F01D 9/023 277/355 |
| 6,644,668 | B1 | 11/2003 | Albers et al. | |
| 8,366,115 | B2 | 2/2013 | Addis | |
| 8,596,973 | B2 * | 12/2013 | Grondahl | F01D 11/003 415/231 |
| 9,206,904 | B2 | 12/2015 | Lee et al. | |
| 9,225,486 | B2 | 12/2015 | Hundal et al. | |
| 9,366,444 | B2 * | 6/2016 | Salunkhe | F01D 9/023 |
| 9,512,922 | B2 * | 12/2016 | Takeuchi | F01D 11/001 |
| 9,677,423 | B2 * | 6/2017 | Faulder | F01D 25/186 |
| 2008/0061513 | A1 * | 3/2008 | Awtar | F01D 11/001 277/355 |
| 2015/0369074 | A1 * | 12/2015 | Faulder | F01D 25/186 415/174.5 |
| 2016/0061330 | A1 | 3/2016 | Davis | |

FOREIGN PATENT DOCUMENTS

| | | |
|---|---|---|
| EP | 1878873 A2 | 1/2008 |
| EP | 2963160 A1 | 1/2016 |
| WO | WO2015/005972 A1 | 1/2015 |

OTHER PUBLICATIONS

Extended European Search Report for EP Application No. 17167864.2, dated Sep. 21, 2017, 8 pages.

* cited by examiner

HIGH TEMPERATURE SEAL AND METHOD

BACKGROUND

The described subject matter relates generally to seals, and more specifically to circumferential seals and seal segments suitable for high temperature environments.

Conventional brush seals for engines, such as axial flow turbine engines, are currently made from low-cost, finely drawn wires derived from basic nickel- or cobalt-based alloys. These conventional brush seal configurations, under the thermal and pressure differentials seen in and around the gas path. At the same time, higher temperature superalloys have been introduced into more parts of such engines to increase efficiency through higher combustion temperatures, which can exceed the creep temperature of conventional brush seal alloys.

Early generations of superalloys are also occasionally used in brush seals. These have relatively low concentrations of gamma-prime precipitate. To date, it has been difficult and impractical to consistently process the more recent generations of superalloys, characterized generally by increased concentrations of gamma-prime precipitate, into the finely sized wires typical of conventional brush seals. Specifically, concentrations of gamma-prime precipitate can be increased to help the material withstand the higher turbine temperatures in advanced gas turbine engines. However, in terms of quality, consistency, and manageable processing costs, it becomes impractical or impossible to process a material having increased concentrations of gamma-prime precipitate into wires having a sufficiently thin diameter for use as a brush seal without unduly sacrificing thermal and mechanical properties of the seal.

SUMMARY

An embodiment of a turbine assembly includes, among other possible things, a first component including a first component surface, a second component including a second component surface spaced apart from the first component surface, and a brush seal. The brush seal includes, among other possible things, a first bristled region extending in a first direction from a backing plate, and sealingly engaged with at least one of the first component surface and the second component surface. At least one of the backing plate and the first bristled region includes a nickel-based superalloy material having at least 40% of a $Ni_3(Al,X)$ precipitate phase, X being a metallic or refractory element other than Al.

An embodiment of a brush seal includes, among other things, a first bristled region extending in a first direction from a backing plate for sealingly engaging at least one component surface. At least one of the backing plate and the first bristled region includes a nickel-based superalloy material having at least 40% of a $Ni_3(Al,X)$ precipitate phase, X being a metallic or refractory element other than Al.

An embodiment of a method for making a brush seal includes, among other possible steps, providing a base material comprising a nickel-based superalloy material having at least 40% of a $Ni_3(Al,X)$ precipitate phase, X being a metallic or refractory element other than Al. A backing plate and a bristled region are formed, at least one of which is formed from a first portion of the base material. The first bristled region is secured to the backing plate such that a plurality of bristles extends in a first direction from the backing plate for sealingly engaging at least one component surface.

DETAILED DESCRIPTION

A brush seal configuration (and methods for making) includes a superalloy backing plate and bristles. One or both of these are formed from precipitation hardened nickel superalloys, including but not limited to single crystal superalloys. To date, processing of precipitation hardened superalloys, and particularly those in single crystal form, has been difficult, and consistency in results remains an issue. The described brush seal configuration can effectively block high pressure differentials and withstand increased turbine temperatures in more advanced engines, while restraining processing costs of precipitation hardened superalloys into the components of such a seal.

Figure 1:
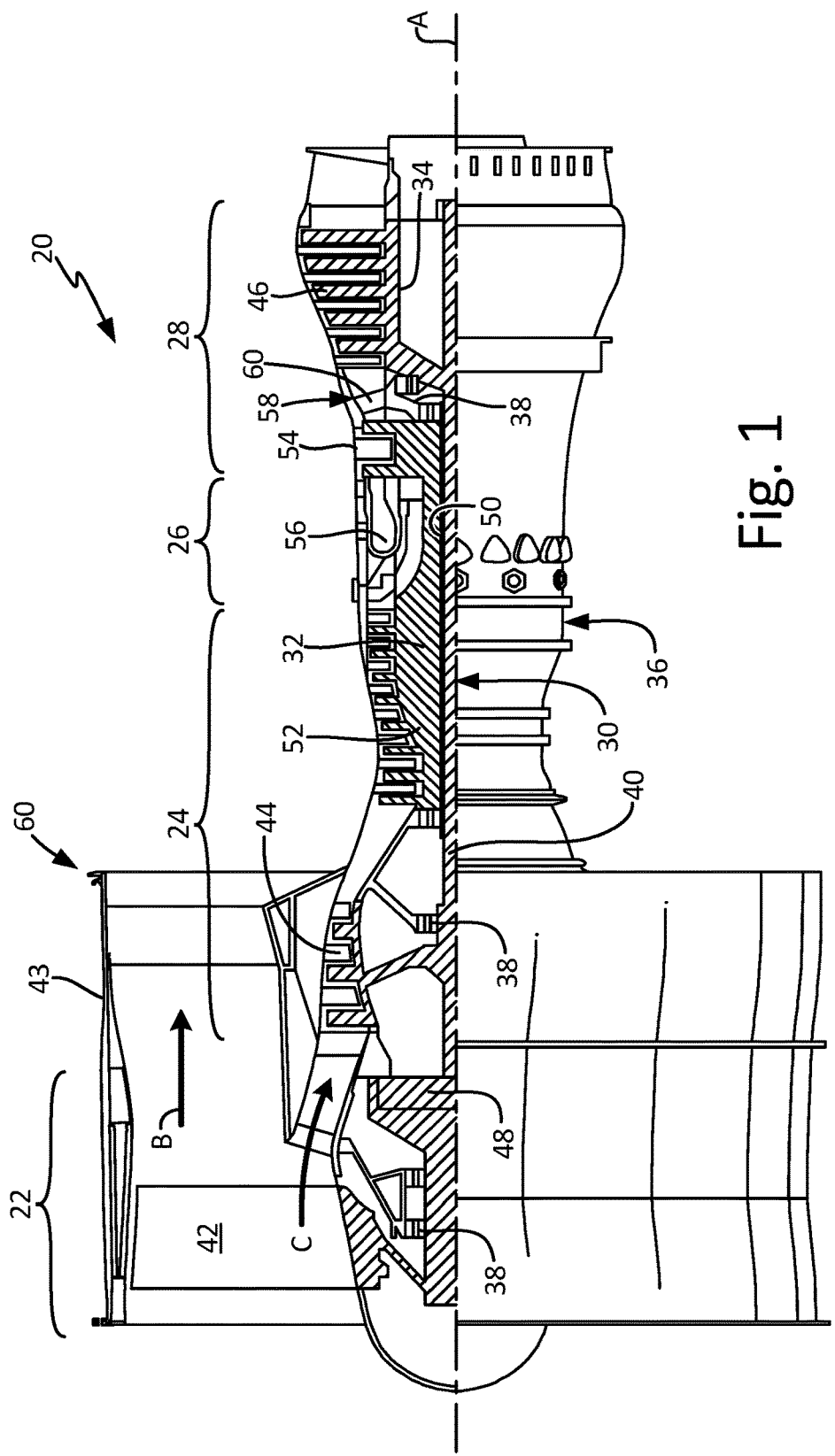
FIG. 1 schematically depicts a basic example embodiment of a gas turbine engine.

FIG. 1 is a quarter-sectional view that schematically illustrates example gas turbine engine 20 that includes fan section 22, compressor section 24, combustor section 26 and turbine section 28. Alternative engines might include an augmenter section (not shown) among other systems or features. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example, an industrial gas turbine; a reverse-flow gas turbine engine; and a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example gas turbine engine 20 generally includes low speed spool 30 and high speed spool 32 mounted for rotation about center axis A of gas turbine engine 20 relative to engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about center axis A.

Combustor 56 is arranged between high pressure compressor 52 and high pressure turbine 54. In one example, high pressure turbine 54 includes at least two stages to provide double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 can be arranged generally between high pressure turbine 54 and low pressure turbine 46. Mid-turbine frame 58 further supports bearing systems 38 in turbine section 28 as well as setting airflow entering the low pressure turbine 46.

The core airflow C is compressed first by low pressure compressor 44 and then by high pressure compressor 52 mixed with fuel and ignited in combustor 56 to produce high speed exhaust gases that are then expanded through high pressure turbine 54 and low pressure turbine 46. Mid-turbine frame 58 includes vanes 60, which are in the core airflow path and function as an inlet guide vane for low pressure turbine 46. Utilizing vane 60 of mid-turbine frame 58 as the inlet guide vane for low pressure turbine 46 decreases the axial length of the low pressure turbine 46 without increasing the axial length of mid-turbine frame 58. Reducing or eliminating the number of vanes in low pressure turbine 46 shortens the axial length of turbine section 28. Thus, the compactness of gas turbine engine 20 is increased and a higher power density may be achieved.

The disclosed gas turbine engine 20 in one example is a high-bypass geared aircraft engine. In a further example, gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, gas turbine engine 20 includes a bypass ratio greater than about ten (10:1) and the fan diameter is significantly larger than an outer diameter of low pressure compressor 44. It should be understood, however, that the above parameters are only exemplary of one embodiment of a gas turbine engine including a geared architecture and that the present disclosure is applicable to other gas turbine engines.

Figure 2A:
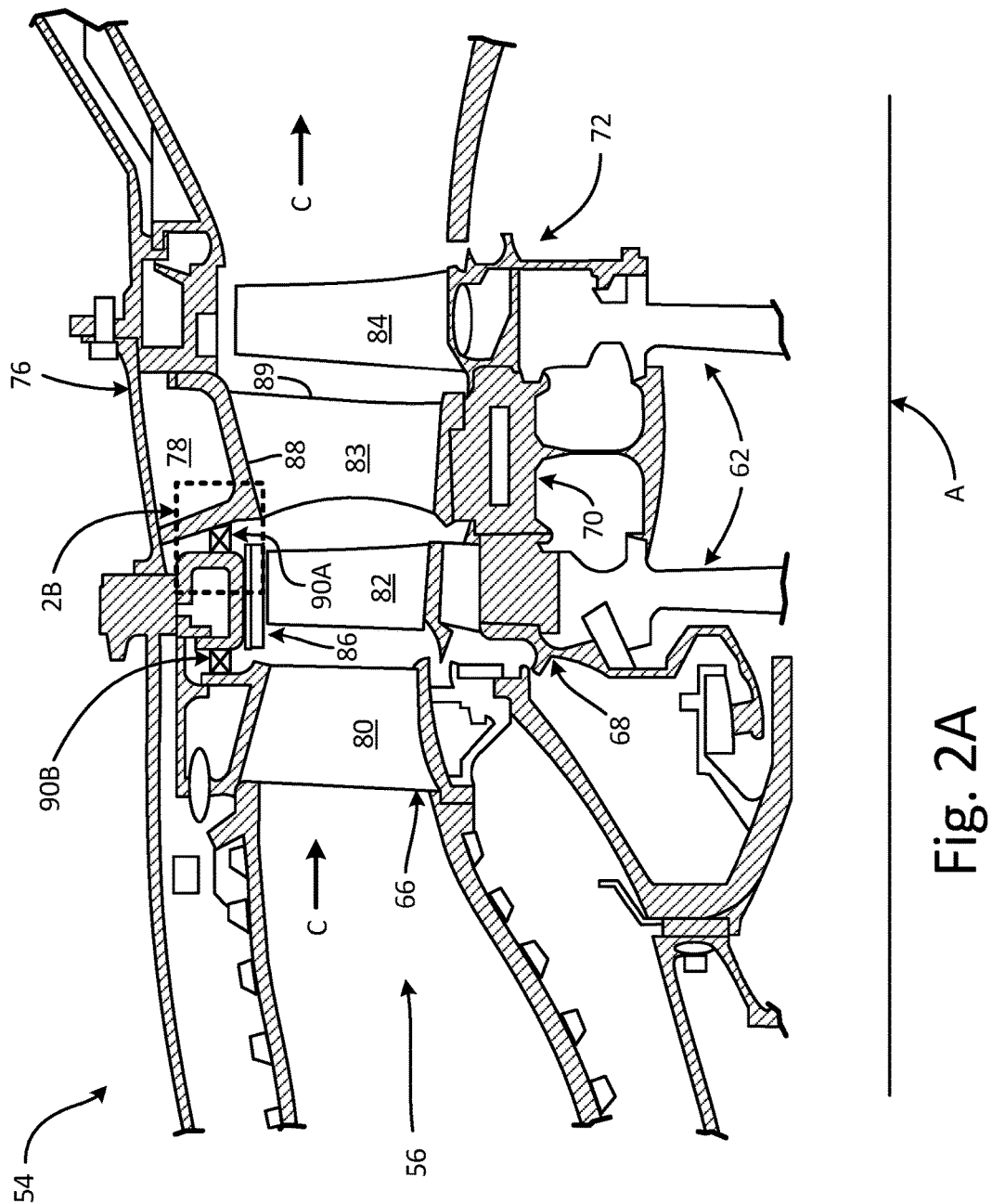
FIG. 2A is a detailed view of a turbine section including one example embodiment of a brush seal disposed at the entrance to a cavity.

FIG. 2A is a cross-sectional view of high pressure turbine section 54 and combustor 56. In this illustrative, but non-limiting, embodiment of high pressure turbine section 54, rotor assembly 62 includes first rotor stage 68 immediately downstream of combustor 56 and first stator stage 66. Second stator stage 70, configured to condition flow into second rotor stage 72, follows first rotor stage 68.

Core casing 76 can be disposed around both rotor assembly 62 and vane assembly 64 and can be spaced radially therefrom in order to form plenum 78 for directing cooling airflow (not shown) to cool components of high pressure turbine section 54. Such components typically include, but are not limited to, arrays of first stator stage/inlet guide vanes 80, first stage rotor blades 82, second stage stator vanes 83, and second stage rotor blades 84. Each of these is arranged in an array around center axis A, but only one of each is shown in the sectional view of FIG. 2A.

A shroud or air seal, such as a blade outer air seal (hereinafter "BOAS") 86 can be spaced about the tips of first stage rotor blades 82, and is connected to core casing 76. Each of second stage stator vanes 83 includes at least one airfoil 89 extending from outer diameter platform 88 toward center axis A. Here, BOAS 86 is a static component that does not rotate about center axis A, and forms a portion of an outer diameter endwall of core flow path C in concert with stator vane outer platform 88. Outer diameter platform 88 can be an endwall segment forming a portion of the outer diameter flow path across second stage stator airfoils 89.

In one embodiment, BOAS 86 includes a plurality of circumferentially extending segments (only one of which is shown in FIG. 2A) and is adapted to limit combustion gas leakage over tips of blades 82. BOAS 86 can also be cooled by air from plenum 78, thereby also allowing BOAS 86 to withstand the high temperatures of the hot combustion gases in core flow path C downstream of combustor 56.

High pressure turbine section 54 can also include circumferential brush seal assemblies 90A, 90B between first and second components of engine 20 to help prevent cooling air from leaking between adjacent components and bleeding into core flow path C. Other seals 90A, 90B can prevent leakage of combustion gases out of core flow path C into other areas.

Figure 2B:
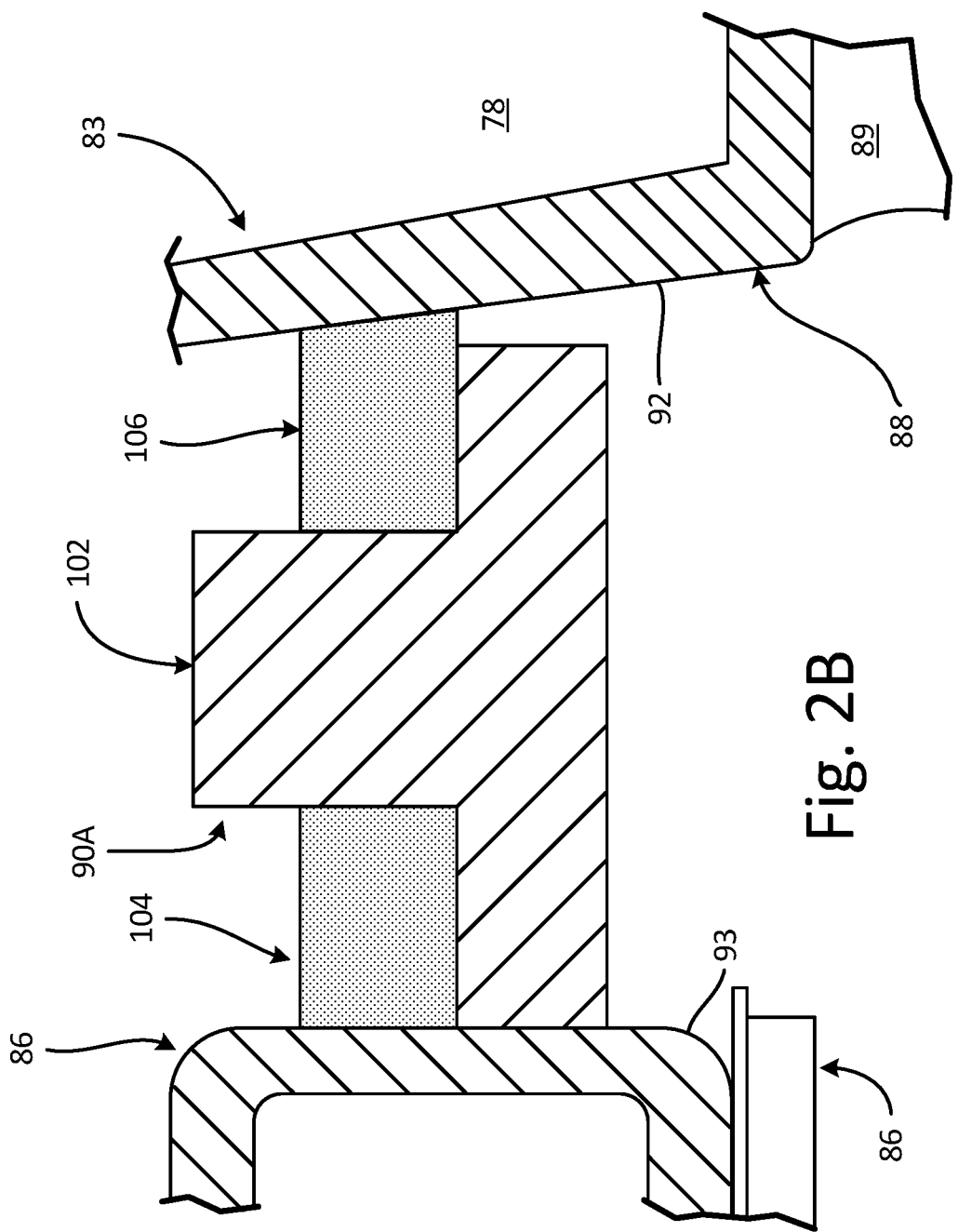
FIG. 2B is a magnified view of FIG. 2A, showing details of the brush seal embodiment.

FIG. 2B is a magnified view of a portion of FIG. 2A, which includes brush seal assembly 90A disposed between generally adjacent first and second components. Hot-side surface 92 of outer diameter platform 88 can be aligned with hot-side surface 93 of BOAS 86. FIG. 2B also shows one example segment 100 of brush seal 90A, including backing plate 102, first bristled region 104, and second bristled region 106.

With respect to brush seal assembly 90A, it is disposed relative to at least one first component surface of a first component (e.g., hot-side surface 93 of BOAS 78), spaced apart from at least one second component surface of a second component (e.g., hot-side surface 92 of outer diameter vane platform 88, defining a cavity therebetween (e.g., plenum 78).

Though shown with respect to segments of BOAS 86 and second stage stator vanes 83, a brush seal according to this disclosure can be adapted for interfacing or sealingly engaging surfaces of two or more components such as various combinations of a static turbine airfoil, a rotating turbine airfoil, and a segmented blade outer air seal (BOAS).

Based on the high temperatures in certain parts of the engine, at least one part of brush seal assemblies 90A, 90B can include a superalloy material. In certain embodiments, the superalloy material is primarily or exclusively a nickel-based superalloy having at least 40% of a $Ni_3(Al,X)$ precipitate phase, where X is a metallic or refractory element other than aluminum (Al). This is typically a gamma-prime phase, depending on the identity of X and the conditions under which the precipitate is formed. To facilitate operation of the engine at even higher temperatures without damaging the brush seal, the superalloy can be formed as a single crystal.

Superalloys in general, and single crystal superalloys in particular are known for their increased thermal and pressure resilience. Increased levels of gamma-prime precipitate, specifically $Ni_3(Al,X)$, can impart favorable thermal and mechanical properties to larger components. However, these same materials are very difficult and expensive to form into the large number of finely drawn, small-diameter wires representative of conventional brush seals while maintaining these favorable properties.

In conventional brush seals, fine individual wires are formed which are then grouped together to form a brush. The fine individual wires are readily formed to a diameter of less than 0.006 inch (0.16 mm) using early-generation superalloys such as Waspaloy®, Haynes 25, or INCO 625. None of these can achieve gamma-prime precipitate levels of more than 25%. The lower level of gamma-prime precipitates in these alloys simplifies production of wires via drawing, extrusion, etc., but the alloys have less resilience to temperature and pressure, particularly as compared to newer superalloys used for other components (airfoils, disks, etc.). Thus as exposure temperatures and pressure differentials increase, e.g., beyond 1350° F. (730° C.) and/or 50 psi (345 kPa), these conventionally formed brush seals more quickly break down due to creep, fatigue, etc., allowing leakage and necessitating frequent replacement.

The high concentration of gamma-prime precipitate characteristic of certain nickel-based superalloys, particularly but not exclusively in directionally solidified or single crystal form, results in internal strain during drawing and extrusion processes used to form thin wires, increasing the risk of premature failure.

As shown in subsequent figures, a brush seal assembly can include one or more segments with a first bristled region extending in a first direction from a backing plate. Optionally a second bristled region extends in a second direction from the backing plate to form a dual-sided brush seal. To alleviate cost and processing constraints for the use of superalloys/single crystals while approximating or exceeding performance of a conventional brush seal, the structure of the brush seal described herein can utilize a plurality of combs or other comb-like structures machined from sheet stock. They are then arranged in a desired order, and secured to a backing plate. Optionally, a relatively limited number of wires, which also can be superalloys/single crystals, can be interspersed with the combs and bristles so as to fill in certain gaps to provide a cost-effective brush seal that is comparable to performance of conventional brush seal but suitable for long-term exposure to higher temperatures and pressures.

Figure 3:
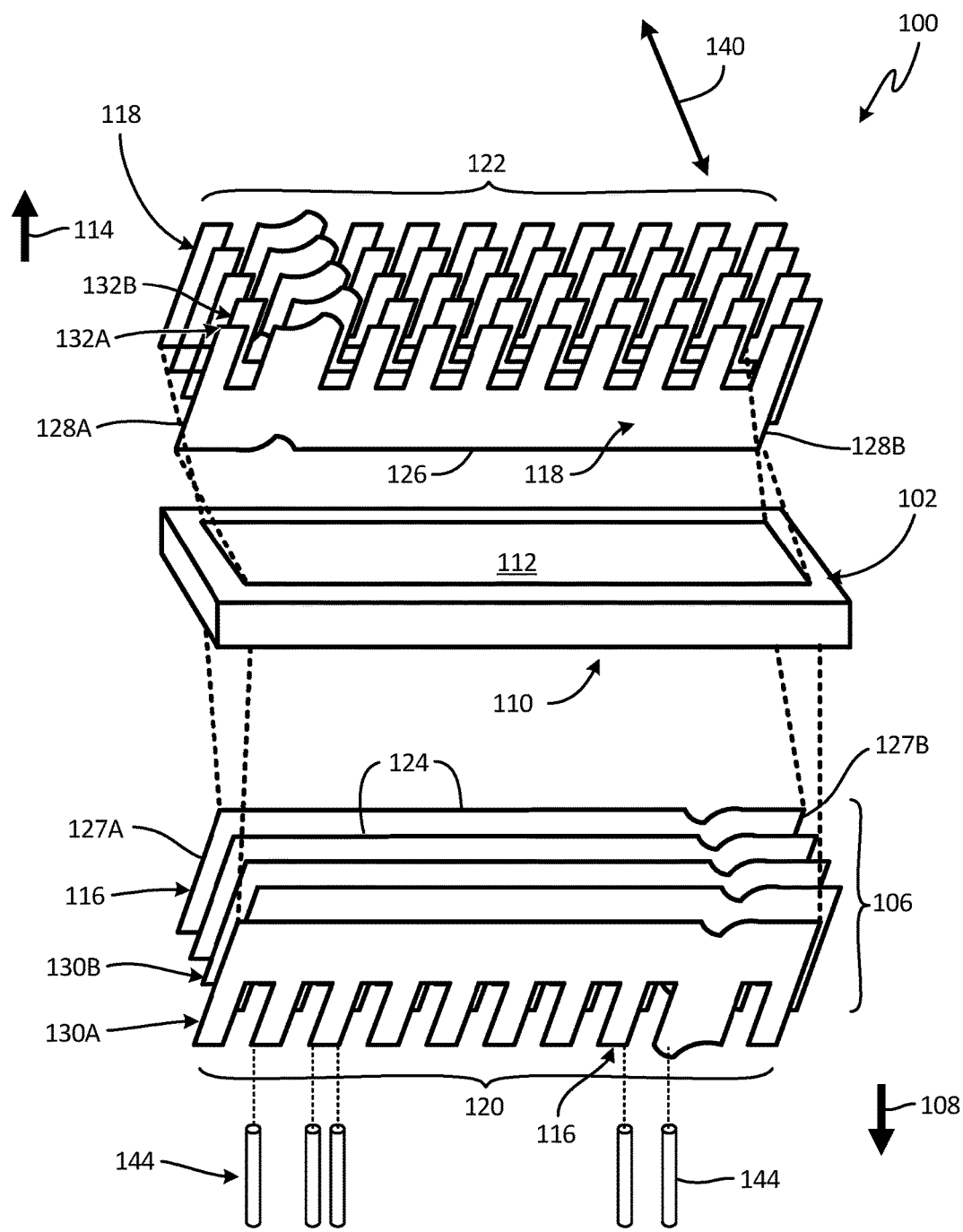
FIG. 3 is an exploded view of a first example embodiment of a brush seal segment according to the present disclosure.

FIG. 3 shows an exploded view of one example brush seal segment 100, including backing plate 102, first bristled region 104, and second bristled region 106. Backing plate 102 can be configured for securing brush seal segment 100 to either a first component or a second component (shown in FIGS. 2A and 2B).

Here, first bristled region 104 extends in first direction 108 from first mounting surface 110 of backing plate 102, while and optional second bristled region 106 extends in second direction 114 from second mounting surface 112. First bristled region 104 and optional second bristled region 106 each include respective first and second pluralities of combs 116, 118. Corresponding first and second pluralities of bristles 120, 122 extend from solid supporting ends 124, 126. The first plurality of combs 116 are attached to first mounting surface 110 such that the plurality of bristles 120 extending from a first of the first plurality of combs 116 forms at least a first row 130A of first bristled region 104. A second, adjacent one of the first plurality of combs 116 can similarly include a plurality of bristles 120 extending from solid supporting end 124 to form at least a second row 130B of first bristled region 104. Supporting ends 124 can be attached, via metallurgical bonding or the like, to first mounting surface 110 of backing plate 102, while supporting ends 126 can similarly be attached, via metallurgical bonding or the like, to second mounting surface 112.

In certain embodiments, second row 130B is linearly offset from adjacent first row 130A to create a tortuous path for fluid (e.g. cooling air or combustion gas) to leak through first bristled region 104. Additionally or alternatively, second row 132B is linearly offset from adjacent first row 132A to create a tortuous path through second bristled region 106. This can be done either by providing a plurality of identically cut combs 116 and/or 118, and then ordering and securing the combs to backing plate mounting surface(s) 110 and/or 112 in an offset manner (e.g., along direction 140). Additionally and/or alternatively, combs 116 and/or 118 can be cut with bristles that are differently spaced and/or phased from one another. In this instance, when supporting ends 124 of adjacent combs 116 are aligned along respective comb edges 127A, 127B, or supporting ends 126 of adjacent second combs 118 are aligned along respective comb edges 128A, 128B, combs can be stacked to result in adjacent rows 130A, 130B of bristles 120 and/or 122 being offset to form the tortuous path.

As noted, optional second bristled region 106 extends in second direction 114 from second mounting surface 112 of backing plate 102. In this example, like first bristled region 104, second plurality of combs 118 are secured such that each comb 118 includes a plurality of bristles 122 defining at least one complete row 132A, 132B of second bristled region 106. Second direction 114 can be partially or completely opposed to first direction 108 (i.e., up to 180° apart). In certain embodiments, second bristled region 106 can alternatively have one or more conventional brush seal features, such as thinly drawn wires made from more conventional, lower-temperature materials, particularly if second bristled region 106 is less likely to be exposed to hotter combustion gases or other fluids.

Returning to first bristled region 104, in certain embodiments, individual ones of the first plurality of combs 116 can be provided with different Young's modulus. This can be tailored in such a way as to meet expected strain, thermal, and other conditions along one or more directions of the first or second bristled regions.

For example, individual ones of the first plurality of combs 116 can be formed such that the Young's modulus of each row 130A, 130B varies along direction 140, either increasing or decreasing in a continuous or stepwise manner. One way this can be done is to provide the combs with a particular crystallographic orientation, as explained in more detail below. Generally, orienting one of the first plurality of combs 116 such that the bristles in row 130A align with or near the <100> crystallographic direction, would correspond to a lower modulus having lower strength, but would increase thermal resistance. Orienting the bristles in row 130A to align in the <111> direction, would correspond to a higher modulus, increasing natural frequency of the bristles for exposure to areas of higher expected stress and/or vibration. The modulus for each row 130A, 130B can be balanced against expected thermal and pressure loads at a particular point along direction 140.

To fill gaps in one or more rows 130A, 130B, a plurality of extruded rods 144 can be metallurgically bonded to brush seal segment 100. Rods 144 can be bonded directly to backing plate 102 and/or to one or more combs 116, 118. Rods 144 can be interspersed between ones of the rows of bristles 130A, 130B to enhance performance of first and/or second bristled regions 104, 106 in a cost-effective manner. Rods 144 can be of any suitable form, but in certain embodiments, can include a superalloy with gamma-prime/ $Ni_3(Al,X)$ precipitate concentration of at least 40% by volume.

Figure 4A:
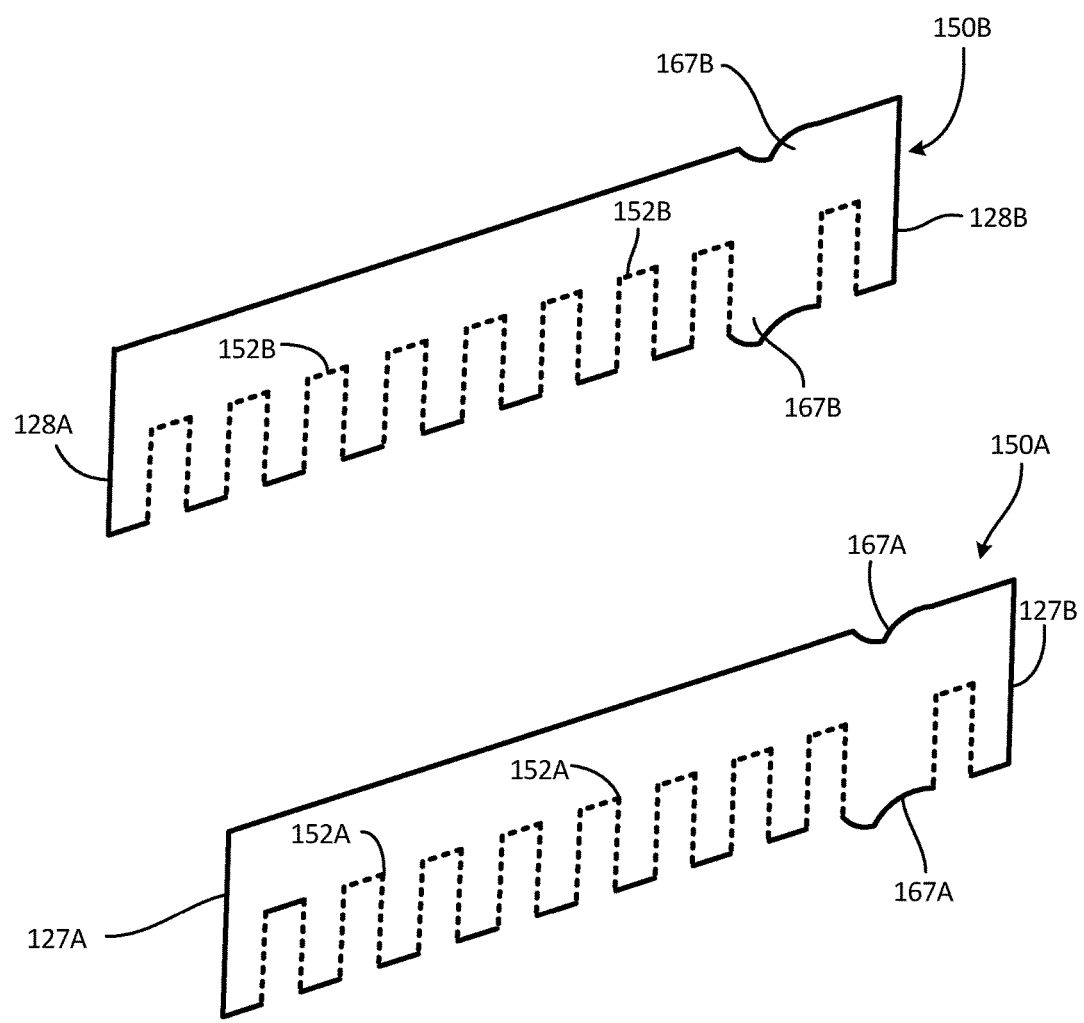
FIG. 4A shows a pair of precursors of the first example embodiment in FIG. 3.

FIG. 4A shows two comb precursors 150A, 150B corresponding to adjacent ones of the first plurality of combs 116 for brush seal segment 100 (shown in FIG. 3). At least one of precursors 150A, 150B includes a sheet of base material comprising a superalloy material. The superalloy material can include a nickel-based superalloy having at least 40% of a $Ni_3(Al,X)$ precipitate phase, X being a metallic or refractory element other than Al. In certain embodiments, the base material is additionally or alternatively a single crystal. In certain embodiments, such a base material can also be used to form backing plate 102 (shown in FIG. 3) or a precursor thereof.

In forming precursors 150A, 150B, one can start with a sheet or roll of superalloy material according to the description in the immediately preceding paragraph. Thickness of the sheet or roll, in certain embodiments, can be on the order of 0.004 inch to 0.050 inch (0.10 mm to 1.27 mm) inclusive in order to maintain suitable flexibility of the resulting combs. Though the sheet or roll can be formed by any suitable method, one example process for such a material can generally include casting an ingot in the form of a block or other basic structure. The casting is then processed into sheets approximating a desired thickness. Details of a suitable process can be found in commonly owned U.S. patent application Ser. No. 15/004,591 filed Jan. 22, 2016, which is entitled "THIN SEAL FOR AN ENGINE" and is incorporated herein by reference in its entirety.

After forming each precursor to desired thickness, length, and/or width dimensions, each precursor is further processed to form the plurality of combs having bristles and gaps therebetween. In FIG. 4A, dashed lines 152A on precursor 150A represent cut lines for forming individual bristles 154A and individual gaps 156A (shown in FIG. 4B). Similarly, dashed lines 152B on precursor 150B represent cut lines for individual bristles 154B and gaps 156B. Individual bristles 154A and gaps 156A can be formed on precursor 150A and/or individual bristles 154B and gaps 156B can be formed on precursor 150B by any suitable cutting or machining technique, such as but not limited to abrasive or laser cutting, or EDM.

For purposes of clarity, individual bristles 154A, 154B and gaps 156A, 156B are shown as being much larger than most physical embodiments. This representation is also delineated by the broken area 167A, 167B to one side of each comb precursor 150A, 150B. In certain embodiments, the width $W_B$ of each bristle is on the order of 0.050 inch to 0.150 inch (1.27 mm to 3.81 mm) inclusive, while the width of each gap $W_G$ can be within a range on the order of 0.005 inch to 0.050 inch (0.127 mm to 1.27 mm). A difference or proportion in bristle dimensions in this range can be tailored relative to gap dimensions can assist in sealing effectiveness while maintaining flexibility of the bristles.

Once formed into adjacent ones of the first plurality of combs (e.g., combs 116A and 116B) can be stacked or arranged into first bristled region 104 (shown in FIG. 3) such that the at least one complete row of bristles (e.g., 130A) from a first one of the combs is linearly offset from at least one complete row of bristles (e.g., 130B) from an immediately adjacent one of the plurality of combs. The first bristled region is then secured to backing plate 102 such as is shown in FIG. 3. This can be done by metallurgical bonding or any suitable joining technique.

Figure 4B:
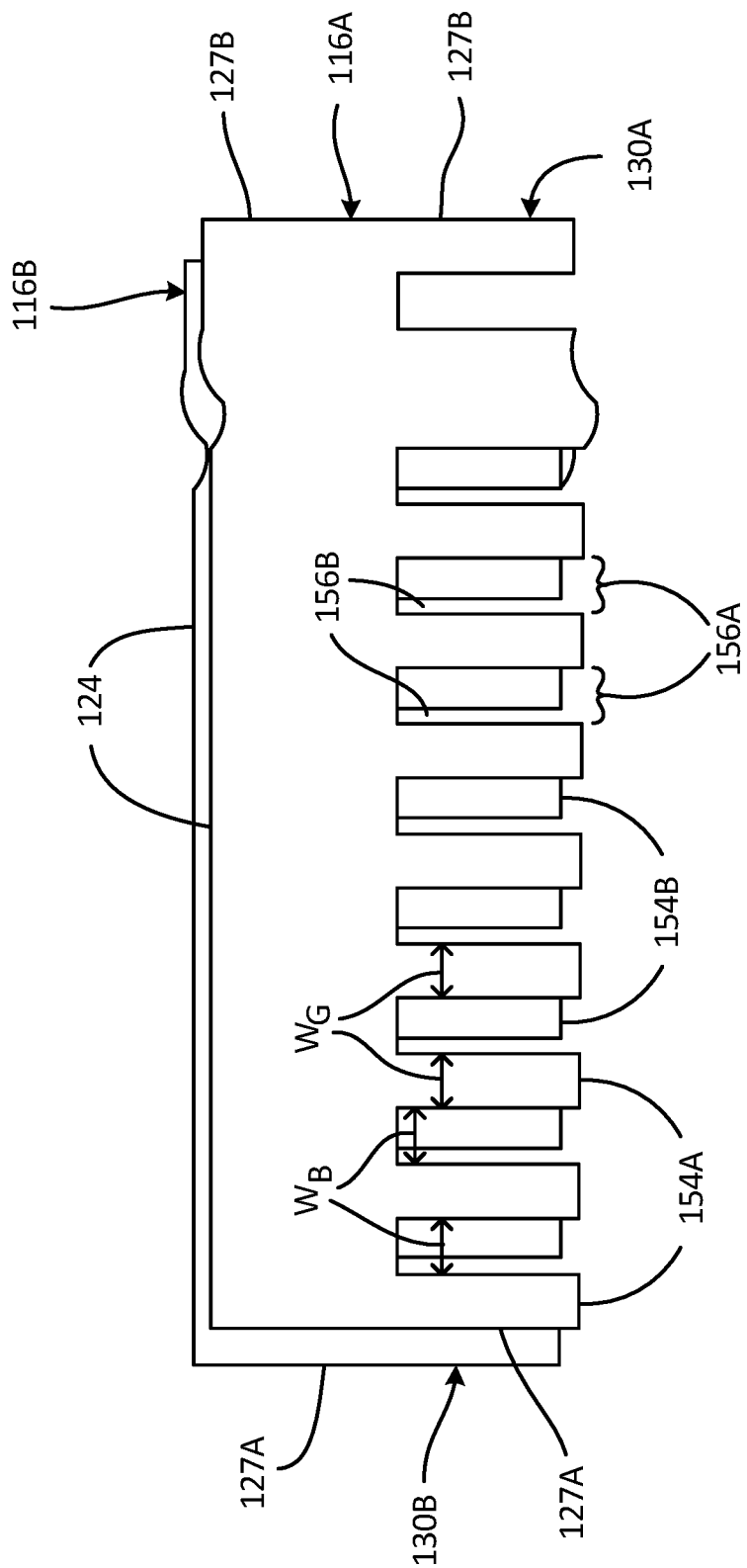
FIG. 4B shows adjacent ones of sheets taken from FIG. 4A, each of which are processed into a comb-like structure.

FIG. 4B shows that comb 116A can be arranged with each comb edge 127A, 127B aligned with comb edges 127A, 127B of adjacent comb 116B, since at least some of bristles 154A are offset from at least some of bristles 154B, and at least some of gaps 156A are offset from at least some of gaps 156B With offset bristles and gaps on additional adjacent combs, the tortuous path described with respect to FIG. 3 can be created.

Figure 5:
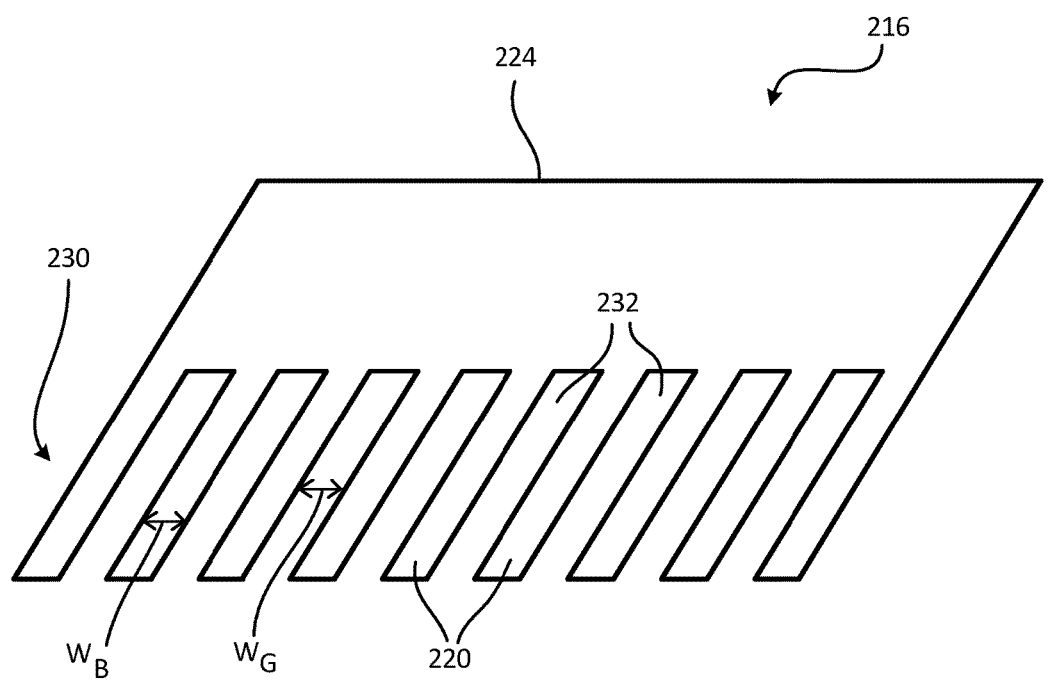
FIG. 5 shows an alternative comb shape for a second example brush seal embodiment.

FIG. 5 shows an alternate embodiment of comb 216 with a plurality of slanted bristles 220 extending from solid supporting end 224. One or more combs 216 can form at least one complete row 230 of slanted bristles 220 and can replace one or more of combs 116, 118 shown in preceding figures. The projection angle of individual slanted bristles 220, separated by gaps 232, as well as their dimensions and spacing (e.g., $W_B$ and $W_G$) can be configured in view of expected forces imparted to the bristles during operation of the component or system (e.g., engine 10 in FIG. 1).

Figure 6:
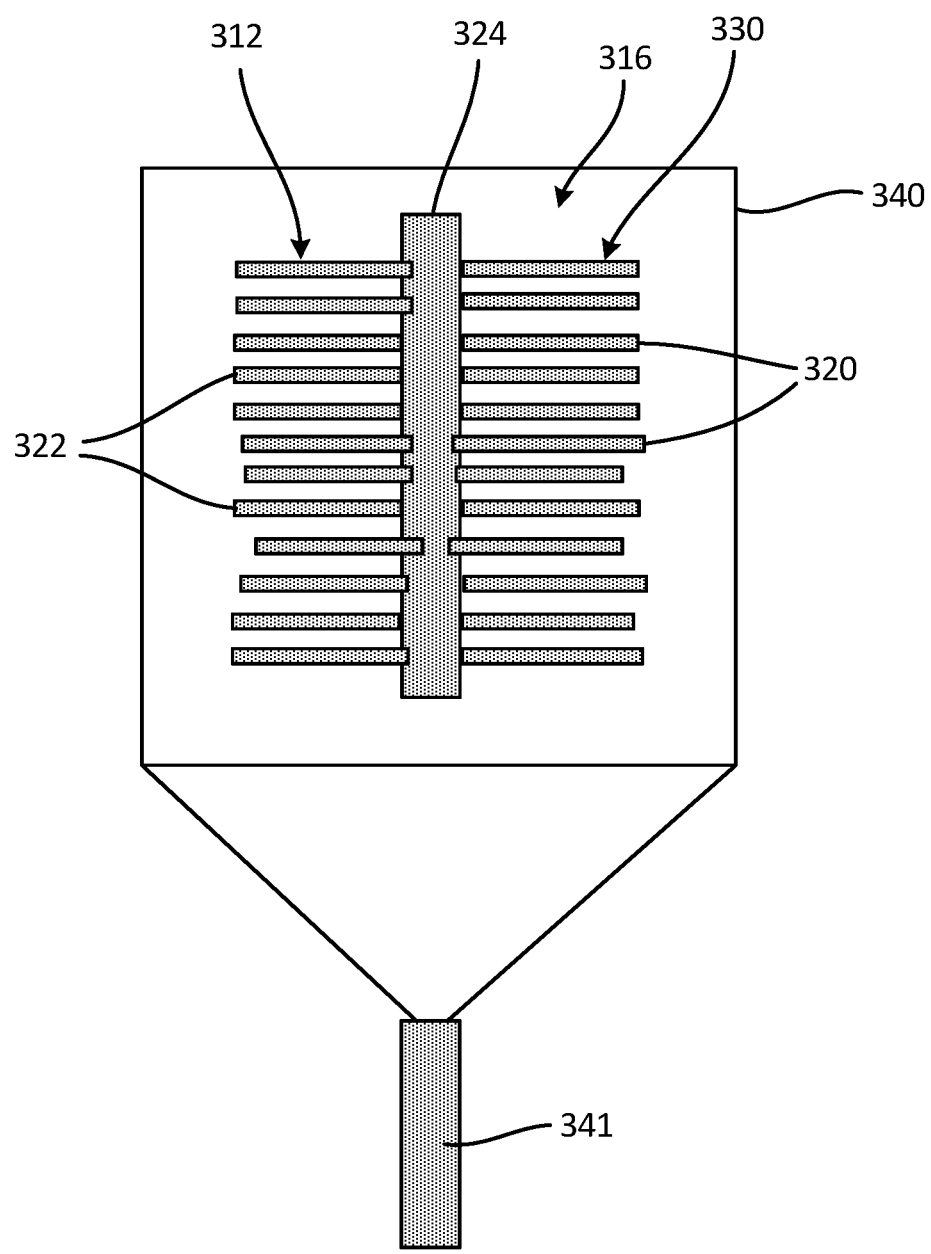
FIG. 6 shows a casting apparatus for forming embodiments of a brush seal comb.

FIG. 6 shows an alternative method for forming a comb which reduces or eliminates required machining. Comb 316 can be directly cast into a near net shape article in an investment mold 340 or other suitable casting arrangement. In this example, comb 316 is a dual-sided comb with first bristles 320 and second bristles 322 extending in opposing directions from solid supporting end 324. Each side has at least one complete row of bristles 330, 332.

Dual-sided comb 316 can be used in an alternative embodiment of a dual-sided brush seal assembly 90A (shown in FIG. 2B) where supporting end 324 is mounted to a plate extending perpendicularly from comb 316 (e.g., into or out of the page in FIG. 6). Alternatively, comb 316 can be split into a pair of complementary individual combs along a length of supporting end 324 (i.e., top to bottom in FIG. 6).

Comb 316 can be directionally solidified into a single crystal, or columnar grain arrangement through use of seed crystal 341 at the base of mold 340. Crystallographic orientation can be selected as desired for individual combs based on their intended position in a brush seal assembly, such as is shown and described with reference to FIG. 3.

Though more expensive and labor-intensive than using precursors from sheet or roll stock, this approach significantly reduces the amount of post-processing required to arrive at the desired shape of the comb, including the desired, size, shape, and spacing of bristles. And through use of known casting methods, the crystallographic orientation can be more closely tailored for each individual comb depending on its intended location in bristled region 104 along direction 140 (shown in FIG. 3).

Figure 7A:
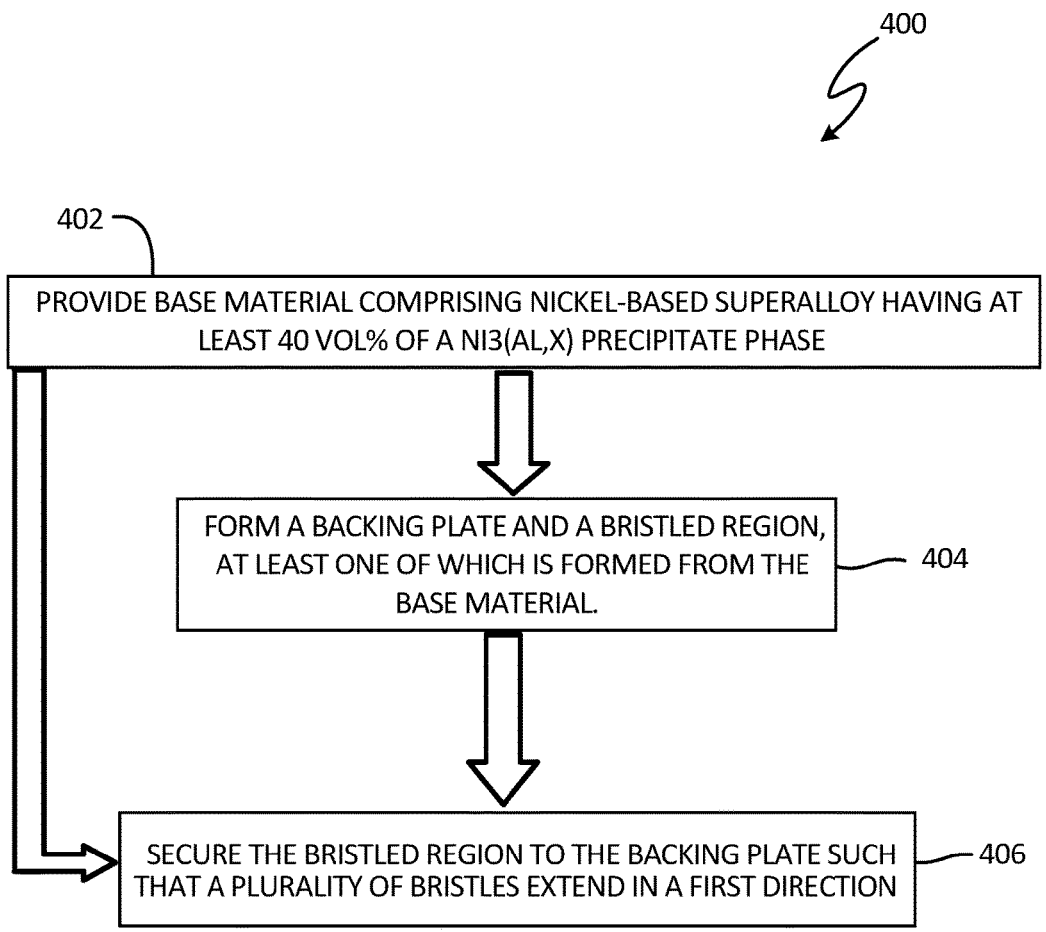
FIG. 7A is a flow chart showing steps of a method for forming a brush seal.

FIG. 7A summarizes a first example embodiment 400 of a method for forming a brush seal according to this disclosure. Step 402 includes providing a base material comprising a nickel-based superalloy material having at least 40% of a Ni$_3$(Al,X) precipitate phase, X being a metallic or refractory element other than Al. In certain embodiments, the base material can be provided via casting or powder metallurgy in appropriate form such as blocks, ingots, or the like. In certain embodiments, the casting is a coarse grained polycrystalline casting or a directionally solidified columnar grain or single crystal casting. In certain embodiments, a consolidated powder metallurgy superalloy has a fine grain microstructure.

At step 404, a backing plate and at least one bristled region are formed, at least one of which is formed from the base material. It will be recognized that the steps of method 400 can be readily adapted to form multiple bristled regions, one or more of which have bristles with at least 40% of a Ni$_3$(Al,X) precipitate phase.

Generally, forming the bristled region can include forming the base material into a plurality of combs, each comb including a plurality of bristles defining at least one complete row of the first bristled region. Each of the plurality of combs can be stacked with same or differing sizes, spacing, inclination, and/or crystal orientation to form a bristled region with properties appropriate for the desired application and expected conditions. One example is illustrated and described with respect to FIGS. 4A and 4B, where combs are formed and stacked such that at least one complete row of bristles from a first of the plurality of combs is linearly offset from the at least one complete row of bristles from an immediately adjacent comb. For one example embodiment of forming a plurality of combs from the superalloy base material, refer to FIG. 7B.

In certain alternative embodiments, at least some of the base material can formed in a near net shape of a desired comb-like or other bristled structure, either by powder metallurgical consolidation or casting methods (see, e.g., FIG. 6). In such a case, intermediate steps can be abridged or omitted as appropriate.

Step 406 includes securing elements of the first bristled region to the backing plate such that a plurality of bristles extends in a first direction from the backing plate. With the structure of stacked combs arranged to have a solid supporting end (see FIGS. 3-6), the combs can be metallurgically bonded to the backing plate without welding or brazing temperatures unduly affecting the ordering, sizes, spacing, inclination, and/or crystal orientation of the bristles in each row of the bristled region.

Figure 7B:
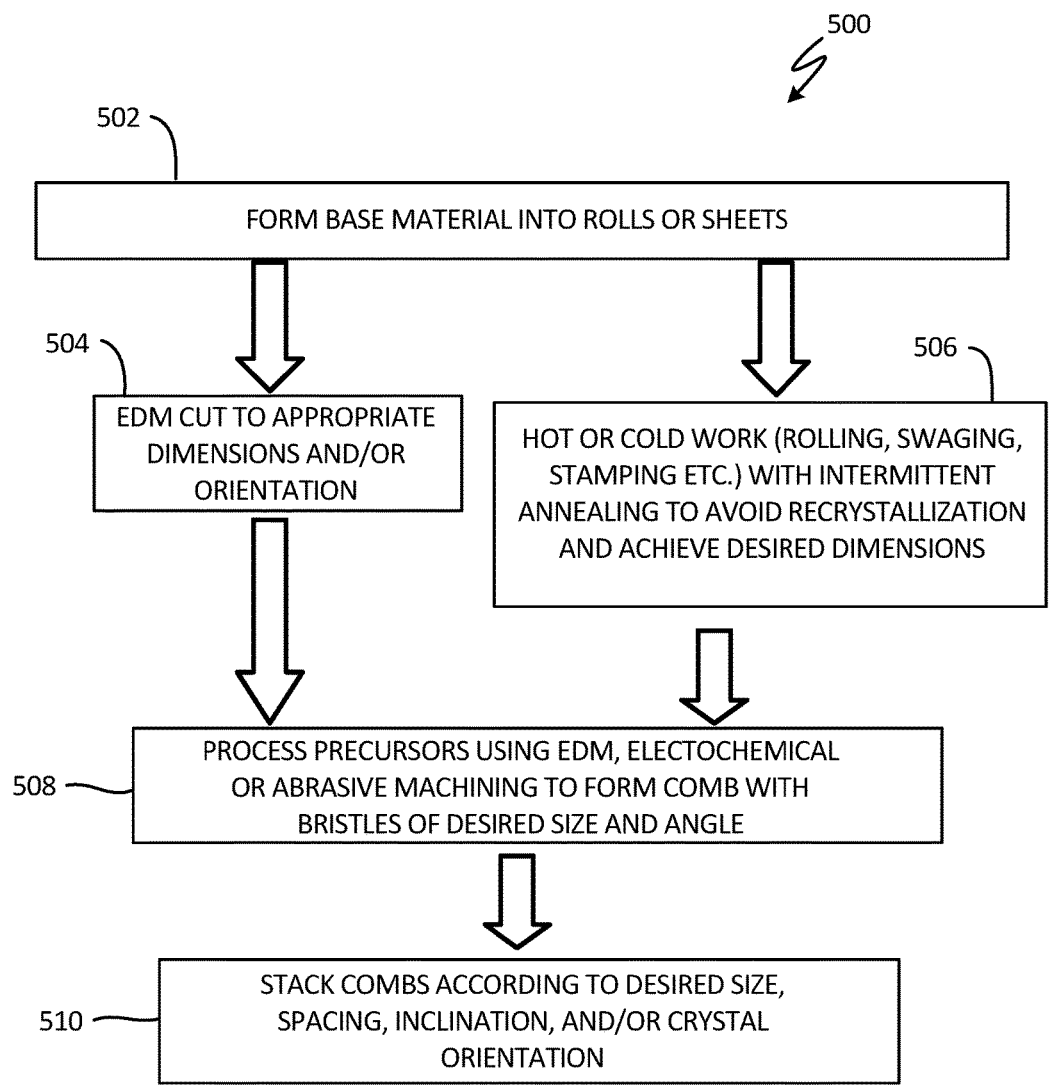
FIG. 7B is a flow chart showing steps of a method of forming combs for a seal.

FIG. 7B summarizes steps of an example method 500 for forming a bristled region for a brush seal according to this disclosure. This can be used to achieve, but is not limited to use with step 404 shown in FIG. 7A. In method 500, step 502 includes forming the base material into block or ingot. This can be done, for example, by processing. For precursors to combs used in the bristled region, the thickness can be in a range of 0.004 to 0.050 inches (0.25 to 1.27 mm) inclusive. For the backing plate, the thickness can be in a range of 0.039 to 0.50 inches (1.0 to 12.7 mm) inclusive.

By one or both of steps 504 and 506, depending on the form of the base material resulting from step 502, the base material is processed into precursors from a roll, a flat sheet, or a curved sheet having a desired thickness. Step 504 includes cutting strips or sheets off of the block or ingot of base material via EDM or other process to approximate the desired thickness. If the block or ingot of base material has a particular crystallographic orientation, the cutting direction during step 504 can be selected according to a desired orientation for the properties of the precursor and resulting combs. For step 506, hot or cold work (rolling, swaging, stamping, etc.) may additionally or alternatively be desirable, in conjunction with intermittent annealing to avoid recrystallization to achieve desired length and shape. Examples of these steps are described in more detail with reference to the incorporated '591 application.

Once the sheets and/or rolls are processed according to steps 504 and/or 506 into an appropriate precursor shape and crystallographic orientation (if desired), each precursor can be further processed as part of step 508 to form elongated combs with bristles of desired dimensions. Optionally bristles can be provided at a desired projection angle from a solid supporting end of the comb. This can be done, for example, through multiple repeated cuts of the precursor(s) using EDM, electrochemical machining, and/or abrasive processing (See, e.g., FIGS. 4A-5). With step 510, the combs are stacked with same or differing sizes, spacing, inclination, and/or crystal orientation to form a bristled region with properties appropriate for the desired application and expected conditions. Examples are shown and described with reference to FIGS. 3-4B.

Figure 8:
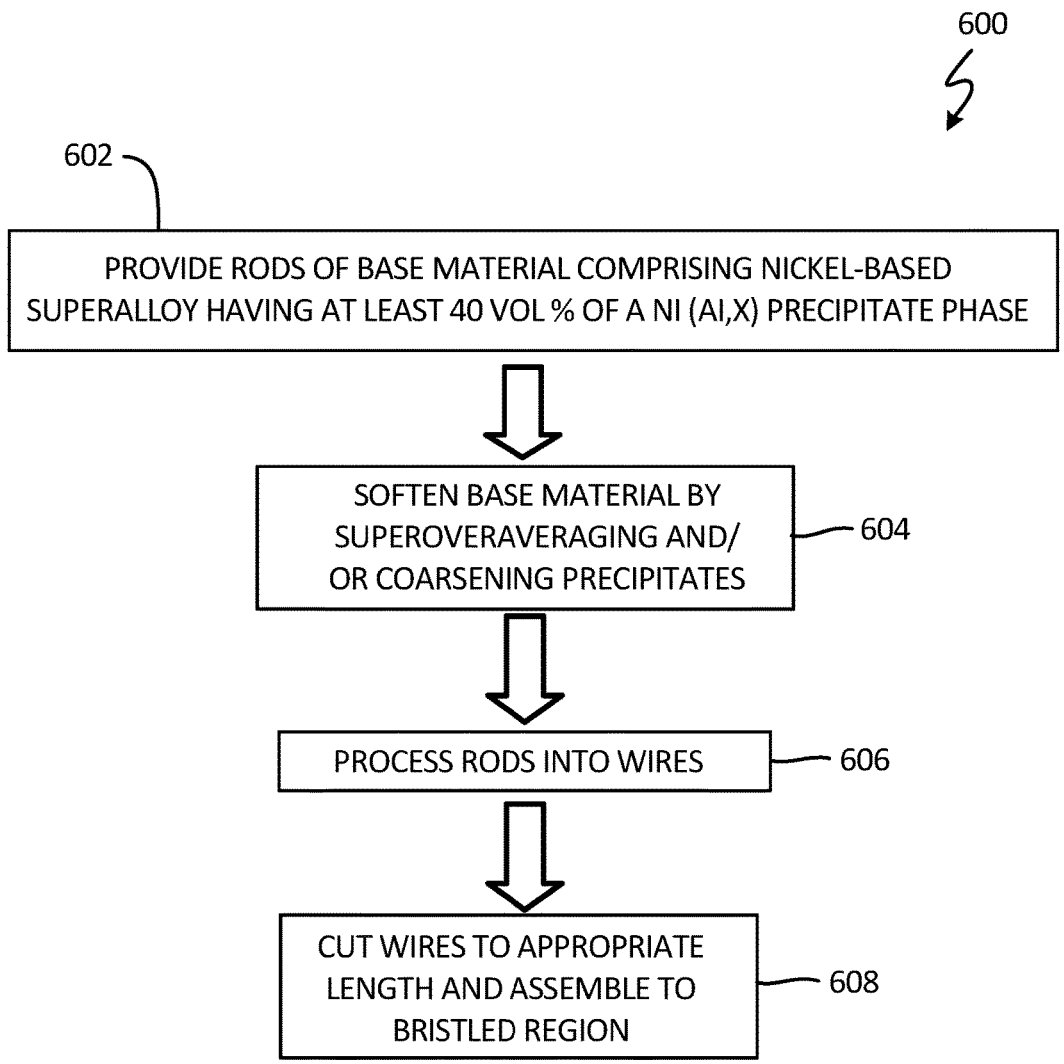
FIG. 8 is a flow chart showing a method for making wires to incorporate with seal combs and bristles.

In certain embodiments, a brush seal can include textured wires similar to those used in more conventional brush seals. In an attempt to reduce costs and simplify processing, the plurality of textured wires can be interspersing between and/or around ones of the plurality of combs. An example method for forming such wires is outlined as method 600 in FIG. 8.

At step 602, a portion of the base superalloy material can first be arranged into or provided as rods or other elongated shape. Step 604 includes optionally softening the material by super-overaging and/or coarsening precipitates according to known processes.

With step 606, the sufficiently soft rods are manipulated into a plurality of textured wires having a generally round cross-section. This can be achieved by swaging, extruding, and/or drawing the rods to lengthen them and reduce their diameter. Once formed into textured wires, step 608 includes cutting them to a desired length and assembling them to the brush seal, including in or around the combs of the bristled region.

Though effective at providing relatively thin wires, the method is labor-intensive, and does not yet reliably achieve wires which retain at least 40% gamma-prime precipitate volume concentration while retaining their thermal and mechanical properties after being attached to a backing plate. However, such wires can be used in limited quantities, such as is shown in FIG. 3 to supplement sealing performance of the comb-like structures by filling in gaps and increasing the length of the tortuous fluid path through the bristled region(s).

Discussion of Possible Embodiments

The following are non-exclusive descriptions of possible embodiments of the present disclosure.

An embodiment of a turbine assembly includes, among other possible things, a first component including a first component surface, a second component including a second component surface spaced apart from the first component surface, and a brush seal. The brush seal includes, among other possible things, a first bristled region extending in a first direction from a backing plate, and sealingly engaged with at least one of the first component surface and the second component surface. At least one of the backing plate and the first bristled region includes a nickel-based superalloy material having at least 40% of a Ni$_3$(Al,X) precipitate phase, X being a metallic or refractory element other than Al.

The turbine assembly of the preceding paragraph can optionally include, additionally and/or alternatively, any one or more of the following features, configurations and/or additional components:

A turbine assembly according to an exemplary embodiment of this disclosure, among other possible things, includes a first component, including a first component surface; a second component including a second component surface spaced apart from the first component surface; and a brush seal disposed between the first component and the second component, the brush seal comprising: a backing plate; and a first bristled region extending in a first direction from the backing plate and sealingly engaging at least one of the first component surface and the second component surface; wherein at least one of the backing plate and the first bristled region comprises a nickel-based superalloy material having at least 40% of a $Ni_3(Al,X)$ precipitate phase, X being a metallic or refractory element other than Al.

A further embodiment of the foregoing assembly, wherein the superalloy material comprises a single crystal.

A further embodiment of any of the foregoing assemblies, wherein the first bristled region comprises: a first comb including a first plurality of bristles extending from a solid supporting end.

A further embodiment of any of the foregoing assemblies, wherein the supporting end is attached to a first mounting surface of the backing plate such that the first plurality of bristles form at least a first row of the first bristled region.

A further embodiment of any of the foregoing assemblies, wherein the first bristled region further comprises: a second comb including a second plurality of bristles extending from a solid supporting end, the supporting end of the second comb attached to the first mounting surface of the backing plate such that the second plurality of bristles form at least a second row of the bristled region; wherein the second row of the first bristled region is linearly offset from the first row of the first bristled region.

A further embodiment of any of the foregoing assemblies, wherein the brush seal further comprises: a second bristled region extending in a second direction from the backing plate, the second direction different from the first direction.

A further embodiment of any of the foregoing assemblies, wherein the second bristled region comprises: a second plurality of combs secured to a second mounting surface of the backing plate, each comb including a plurality of bristles defining at least one complete row of the second bristled region.

A further embodiment of any of the foregoing assemblies, wherein at least one of the first component and the second component includes a component selected from a group consisting of: a static turbine airfoil, a rotating turbine airfoil, and a segmented blade outer air seal (BOAS).

An embodiment of a brush seal includes, among other things, a first bristled region extending in a first direction from a backing plate for sealingly engaging at least one component surface. At least one of the backing plate and the first bristled region includes a nickel-based superalloy material having at least 40% of a $Ni_3(Al,X)$ precipitate phase, X being a metallic or refractory element other than Al.

An embodiment of a brush seal includes, among other possible things, a backing plate; and a first bristled region extending in a first direction from the backing plate; wherein at least one of the backing plate and the first bristled region comprises a nickel-based superalloy having at least 40% of a $Ni_3(Al,X)$ precipitate phase, X being a metallic or refractory element other than Al.

A further embodiment of the foregoing brush seal, wherein the superalloy material comprises a single crystal.

A further embodiment of any of the foregoing brush seals, wherein the first bristled region comprises: a plurality of combs secured to the backing plate, each comb including at least one complete row of bristles forming a portion of the first bristled region.

A further embodiment of any of the foregoing brush seals, wherein the at least one complete row of bristles extend from a solid supporting end of individual ones of the plurality of combs, the supporting end attached to a first mounting surface of the backing plate.

A further embodiment of any of the foregoing brush seals, wherein the plurality of bristles are arranged on the first mounting surface such that adjacent ones of the at least one complete row of bristles are linearly offset from one another.

A further embodiment of any of the foregoing brush seals, wherein the first bristled region further comprises a plurality of extruded rods interspersed between ones of the at least one complete row of bristles.

A further embodiment of any of the foregoing brush seals, wherein the brush seal further comprises: a second bristled region extending in a second direction from the backing plate, the second direction different from the first direction.

An embodiment of a method for making a brush seal includes, among other possible steps, providing a base material comprising a nickel-based superalloy material having at least 40% of a $Ni_3(Al,X)$ precipitate phase, X being a metallic or refractory element other than Al. A backing plate and a bristled region are formed, at least one of which is formed from a first portion of the base material. The first bristled region is secured to the backing plate such that a plurality of bristles extends in a first direction from the backing plate for sealingly engaging at least one component surface.

The method of the preceding paragraph can optionally include, additionally and/or alternatively, any one or more of the following features, configurations and/or additional components:

A method according to an exemplary embodiment of this disclosure, among other possible things, includes providing a base material comprising a nickel-based superalloy material having at least 40% of a $Ni_3(Al,X)$ precipitate phase, X being a metallic or refractory element other than Al; forming a backing plate and a bristled region, at least one of which is formed from a first portion of the base material; and securing the first bristled region to the backing plate such that a plurality of bristles extends in a first direction from the backing plate.

A further embodiment of the foregoing method, wherein the superalloy material comprises a single crystal.

A further embodiment of any of the foregoing methods, wherein forming the bristled region comprises: forming the base material into a plurality of combs, each comb including a plurality of bristles defining at least one complete row of the first bristled region; and stacking the plurality of combs such that the at least one complete row of bristles from a first of the plurality of combs is linearly offset from the at least one complete row of bristles from an immediately adjacent comb.

A further embodiment of any of the foregoing methods, wherein forming the bristled region further comprises: forming a second portion of the base material into a plurality of rods; manipulating the rods into a plurality of textured wires having a generally round cross-section; cutting the plurality of textured wires to a desired bristle length; and interspersing the plurality of textured wires between ones of the plurality of combs.

A further embodiment of any of the foregoing methods, wherein forming the backing plate comprises: forming the single crystal superalloy material into a sheet having a thickness in a range of 0.004 to 0.50 inches (0.10 mm to 12.7 mm) inclusive.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A turbine assembly comprising:
   a first component, including a first component surface;
   a second component including a second component surface spaced in a first direction apart from the first component surface defining a cavity therebetween; and
   a brush seal disposed between the first component and the second component, the brush seal comprising:
      a backing plate including a first mounting surface; and
      a first bristled region including a first of a first plurality of combs attached at a solid supporting end to the first mounting surface of the backing plate, the first plurality of combs each including a plurality of bristles integrally formed with the solid supporting end, each plurality of bristles extending from the solid supporting end into the cavity to form at least a first row of integral bristles sealingly engaging at least one of the first component surface and the second component surface;
      wherein at least the first bristled region comprises a nickel-based superalloy material having at least 40% of a $Ni_3(Al,X)$ precipitate phase, X being a metallic or refractory element other than Al.

2. The assembly of claim 1, wherein the superalloy material comprises a single crystal.

3. The assembly of claim 1,
   wherein a second of the first plurality of combs is attached at the solid supporting end to the first of the first plurality of combs, the integrally formed plurality of bristles extending from the solid supporting end into the cavity to form at least a second row of integral bristles linearly offset from the first row.

4. The assembly of claim 1, wherein the brush seal further comprises:
   a second bristled region extending in a second direction from the backing plate, the second direction different from the first direction;
   wherein the second bristled region comprises a second plurality of combs secured to a second mounting surface of the backing plate, each comb including a plurality of bristles defining at least one complete row of the second bristled region.

5. The assembly of claim 1, wherein at least one of the first component and the second component includes a component selected from a group consisting of: a static turbine airfoil, a rotating turbine airfoil, and a segmented blade outer air seal (BOAS).

6. A brush seal comprising:
   a backing plate; and
   a first bristled region including a first of a first plurality of combs attached at a solid supporting end to the first mounting surface of the backing plate, the first plurality of combs each including a plurality of bristles integrally formed with the solid supporting end, each plurality of bristles extending from the solid supporting end to form at least a first row of integral bristled for sealingly engaging at least one of a first component surface and a second component surface;
   wherein the first bristled region comprises a nickel-based superalloy having at least 40% of a $Ni_3(Al,X)$ precipitate phase, X being a metallic or refractory element other than Al.

7. The brush seal of claim 6, wherein the superalloy material comprises a single crystal.

8. The brush seal of claim 6, wherein the plurality of bristles are arranged on the first mounting surface such that adjacent ones of the first row of bristles and an adjacent second row of bristles are linearly offset from one another.

9. The brush seal of claim 8, wherein the first bristled region further comprises a plurality of extruded rods interspersed between at least the first row and second row of bristles.

10. The brush seal of claim 6, further comprising:
    a second bristled region extending in a second direction from the backing plate, the second direction different from the first direction.

11. A method for making a brush seal, the method comprising:
    providing a base material comprising a nickel-based superalloy material having at least 40% of a $Ni_3(Al,X)$ precipitate phase, X being a metallic or refractory element other than Al;
    forming a bristled region including a first of a first plurality of combs each having a plurality of bristles integrally formed with and extending from a solid supporting end, the bristled region formed from a first portion of the base material; and
    securing the solid supporting end of the first bristled region to a first mounting surface of a backing plate such that the plurality of bristles extends in a first direction from the backing plate for sealingly engaging at least one of a first component surface and a second component surface.

12. The method of claim 11, wherein the superalloy material comprises a single crystal.

13. The method of claim 11, wherein forming the bristled region further comprises:
    forming the base material into a plurality of combs, each comb including a plurality of bristles defining at least one complete row of the first bristled region; and
    stacking the plurality of combs such that the at least one complete row of bristles from a first of the plurality of combs is linearly offset from the at least one complete row of bristles from an immediately adjacent comb.

14. The method of claim 13, wherein forming the bristled region further comprises:
    forming a second portion of the base material into a plurality of rods;
    manipulating the rods into a plurality of textured wires having a generally round cross-section;
    cutting the plurality of textured wires to a desired bristle length; and
    interspersing the plurality of textured wires between ones of the plurality of combs.

15. The method of claim 11, wherein forming the backing plate comprises:
    forming the single crystal superalloy material into a sheet having a thickness in a range of 0.004 to 0.50 inches (0.10 mm to 12.7 mm) inclusive.

* * * * *